(12) United States Patent
Buecherl et al.

(10) Patent No.: US 8,833,194 B2
(45) Date of Patent: Sep. 16, 2014

(54) SHIFT DEVICE WITH OVER-SHIFT LOCK

(71) Applicant: Bayerische Motoren Werke Aktiengesellschaft, Munich (DE)

(72) Inventors: Philipp Buecherl, Munich (DE); Roland Zettler, Munich (DE); Lionel Mathern, Bernolsheim (FR)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/777,593

(22) Filed: Feb. 26, 2013

(65) Prior Publication Data

US 2013/0167682 A1 Jul. 4, 2013

Related U.S. Application Data

(63) Continuation of application No. PCT/EP2011/004594, filed on Sep. 13, 2011.

(30) Foreign Application Priority Data

Sep. 21, 2010 (DE) .......................... 10 2010 041 118

(51) Int. Cl.
*B60K 20/00* (2006.01)
*G05G 5/02* (2006.01)
*B62M 25/02* (2006.01)
*F16H 63/14* (2006.01)
*F16H 63/34* (2006.01)

(52) U.S. Cl.
CPC ................ *G05G 5/02* (2013.01); *B62M 25/02* (2013.01); *B62M 2701/0053* (2013.01); *F16H 63/14* (2013.01); *F16H 63/34* (2013.01)
USPC ...................... 74/473.25; 74/473.26; 74/478

(58) Field of Classification Search
USPC .......... 74/471 R, 473.1, 640, 473.24, 473.25, 74/473.26, 473.3, 478
See application file for complete search history.

(56) References Cited

U.S. PATENT DOCUMENTS 2,680,969 A * 6/1954 Spengler .......................... 74/54
3,369,424 A * 2/1968 Frey ............................ 74/473.1
(Continued)

FOREIGN PATENT DOCUMENTS

DE       77 142 B1    11/1970
DE    22 56 891 A1    12/1973
(Continued)

OTHER PUBLICATIONS

German-language Search Report with partial English translation dated Mar. 24, 2011 (Nine (9) pp.).

(Continued)

*Primary Examiner* — David M Fenstermacher
(74) *Attorney, Agent, or Firm* — Crowell & Moring LLP

(57) ABSTRACT

A shift device with an over-shift lock for a multi-speed transmission of a motor vehicle, in which individual gears are shifted incrementally, is provided. The shift device has a pivotable shifting element which is composed of an activation element and a driver element displaceably held thereon. Both elements have mutually aligned oblong holes which are penetrated by a shifting shaft leading to the transmission. A shifting process is limited by the striking of the shifting shaft against the end sides of the oblong holes. In this position, the alternating influencing of the shifting shaft and the contours of the oblong holes prevents a further rotation of the shifting shaft and thereby an over-shifting of the transmission.

4 Claims, 2 Drawing Sheets

(56) References Cited

U.S. PATENT DOCUMENTS

| | | | | |
|---|---|---|---|---|
| 4,337,676 | A | * | 7/1982 | Tanaka et al. .............. 74/483 PB |
| 4,519,483 | A | * | 5/1985 | Schlicker ................... 192/219.5 |
| 4,694,942 | A | * | 9/1987 | Ogano et al. ................. 192/13 A |
| 5,524,345 | A | * | 6/1996 | Eichhorn ........................ 30/34.1 |
| 8,387,477 | B2 | * | 3/2013 | Ieda et al. ........................ 74/335 |
| 2001/0037700 | A1 | * | 11/2001 | Nishimura et al. ........... 74/473.3 |
| 2003/0010149 | A1 | * | 1/2003 | Hiura et al. ..................... 74/527 |
| 2007/0033762 | A1 | * | 2/2007 | Boissac et al. ................ 15/250.3 |
| 2008/0127767 | A1 | * | 6/2008 | Beer .......................... 74/473.21 |
| 2012/0060635 | A1 | * | 3/2012 | Hoffman .................... 74/473.25 |
| 2013/0125692 | A1 | * | 5/2013 | Sasaki et al. ............... 74/473.36 |

FOREIGN PATENT DOCUMENTS

| | | |
|---|---|---|
| DE | 28 26 040 A1 | 12/1979 |
| DE | 196 17 988 A1 | 11/1997 |
| DE | 196 17 988 C2 | 4/1998 |

OTHER PUBLICATIONS

International Search Report including English language translation dated Oct. 25, 2011 Four (4) pp.).

* cited by examiner

SHIFT DEVICE WITH OVER-SHIFT LOCK

CROSS REFERENCE TO RELATED APPLICATIONS

This application is a continuation of PCT International Application No. PCT/EP2011/004594, filed Sep. 13, 2011, which claims priority under 35 U.S.C. §119 from German Patent Application No. 10 2010 041 118.3, filed Sep. 21, 2010, the entire disclosures of which are herein expressly incorporated by reference.

BACKGROUND AND SUMMARY OF THE INVENTION

The present invention relates to a shift device with an over-shift lock for a multi-speed transmission for motor vehicles and, in particular, to a shift device having a shifting shaft which is rotated incrementally by way of a pivotable shifting element. The shifting element includes hook-shaped claws which, during the pivoting of the shifting element, rotate the shifting shaft by way of driver pins for engaging a next higher or a next lower transmission gear.

Shift devices of this type are frequently found in motorcycles or motorcycle-like vehicles having three or more wheels. They permit a sequential shifting operation; i.e., during each shifting operation, the next-higher or next-lower gear is engaged in the transmission.

German Patent document DE 196 17 988 C2 describes such a shift device. The known solution provides a pivotable shifting arm which is acted upon by a shifting lever operable, for example, by the driver's foot. A shifting element, which rotates a shifting shaft about a defined angle during the pivoting of the shifting arm, is linked to the shifting arm. For this purpose, the shifting element has hook-shaped claws which engage with driver pins arranged circularly around the axis of the shifting shaft. A shift drum with shift forks held in grooves is connected with the shifting shaft. During the rotation of the shifting shaft and, therefore, of the shift drum, the forks shift the gears in the vehicle transmission in a known manner.

In addition to the shifting element, in the case of the known construction, a locking element is linked to the shifting arm. The locking element moves synchronously with the shifting element. Bow-type elements, which are shaped out at the locking element, are used as stops for the driver pins of the shifting shaft, with the goal that, in the event of a shifting intention, the shifting shaft will rotate only by the predefined angular distance.

It is an object of the invention to limit the rotation of the shifting shaft, when shifting is intended, by use of simple devices in the case of a shift device of the above-mentioned type.

This and other objects are achieved by a shift device with an over-shift lock for a multi-speed transmission of a motor vehicle having a shifting shaft which is rotated incrementally by way of a pivotable shifting element, the shifting element including hook-shaped claws which, during the pivoting of the shifting element, rotate the shifting shaft by way of driver pins for engaging a next higher or a next lower transmission gear. The shifting element is designed in two parts. The first component, an activating element, is coupled with the shifting lever and transmits the intention to shift initiated by the shifting lever to the second component, which is a driver element with hook-shaped claws. The two components are springably displaceable with respect to one another along their longitudinal axis and have corresponding oblong holes. A shifting shaft penetrates both oblong holes. At the predefined end of a pivoting movement of the shifting element, the shifting shaft, the activating element and the driver element block one another so that an independent further turning of the shifting shaft caused by inertia is effectively prevented.

When the shifting lever is released, the shifting element will rotate back as a result of a restoring spring, and the contour of the oblong hole in the driver element will permit a release of the blockage. For this purpose, the upper longitudinal side of this oblong hole has the shape of a saddle roof. During the release, the driver element is forced downward by the driver pin assigned to it at that moment, while the shifting shaft moves along a roof inclination of the oblong hole.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
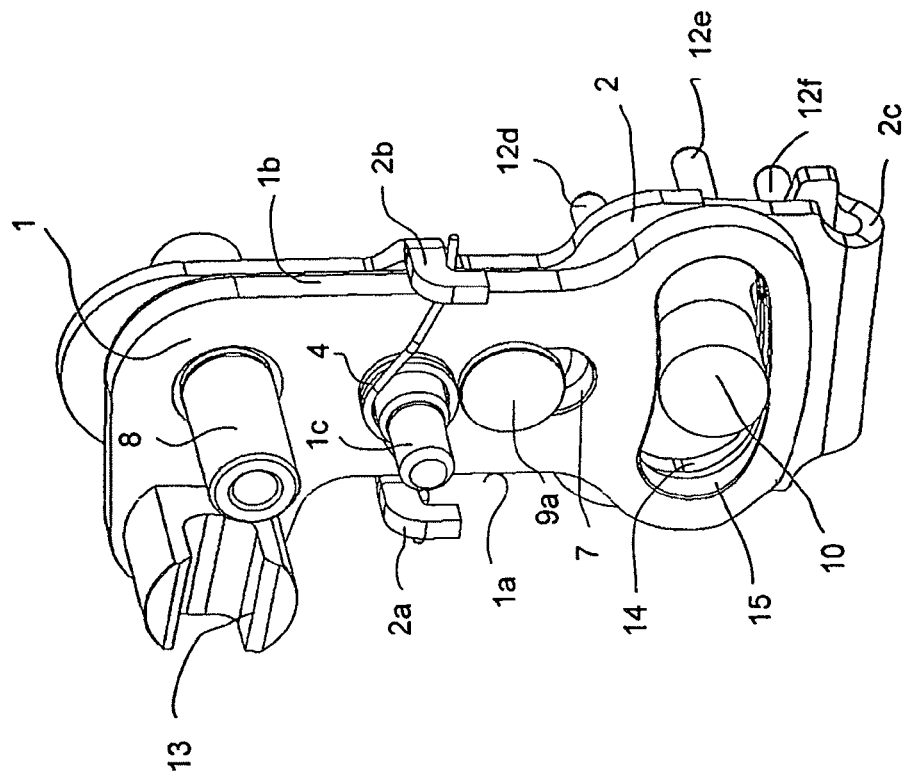
FIG. 1 is a perspective view of a two part shifting element according to an embodiment of the invention.
Figure 2:
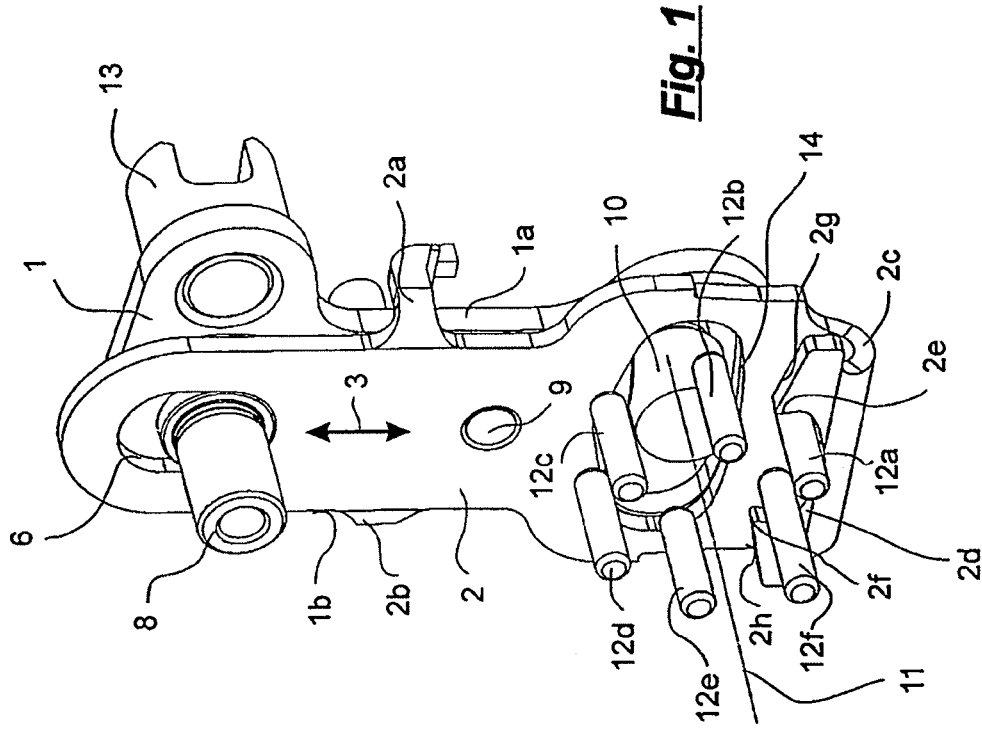
FIG. 2 is a view of the same shifting element as in FIG. 1 from the backside.

The shifting element according to FIGS. 1 and 2 is composed of two essentially flat material components or elements that are placed against one another, specifically an activating element 1 and a driver element 2. As indicated by a double arrow 3, these two elements 1, 2 can be displaced with respect to one another. More precisely, the driver element 2 can shift upward and downward within a predefined path against the force of a restoring spring 4 (FIG. 2) along the longitudinal axis 5 (FIG. 3) of the shifting element with respect to the activating element 1. The restoring spring 4 is fitted as a coil spring onto a pivot 1c of the activating element 1. The limitation of the displacement path takes place by two vertical—thus aligned in the direction of the longitudinal axis 5—oblong holes 6 and 7, an upper oblong hole 6 being provided in the driver element 2 and an oblong hole 7 arranged approximately in the center being provided in the activating element 1. The locations "upper" and "center"—as is also the case other location information described herein—in turn, relate to the longitudinal axis of the shifting element and to its installation position illustrated in the figures.

A bolt 8 fixedly connected with the activating element 1 is guided in the oblong hole 6, whereas the oblong hole 7 receives a shaft 9 of an additional bolt, which is fastened in the driver element 2 and which has a disk-shaped bolt head 9a on its opposite side penetrating the oblong hole 7. At its side illustrated in FIG. 1, the bolt 8 is fastened in a transmission case that is not shown. The bolt head 9a has a greater outside diameter than the width of the oblong hole 7, so that the two components—activating element 1 and driver element 2—are thereby held together. In this case, the length of the bolt shaft 9 is selected such that the components are not deformed with respect to one another but still permit the above-mentioned relative movement.

Figure 4:
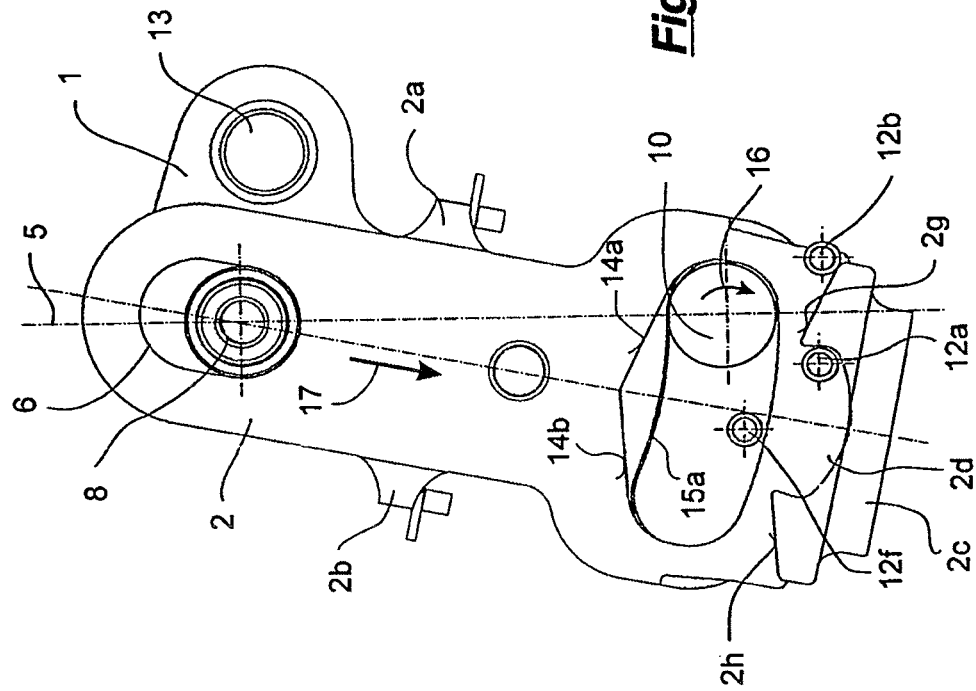
FIG. 4 is a view of the position of the shifting element during a gear shift.

The driver element 2 has lateral lugs 2a and 2b, which are bent at a right angle toward the activating element 1. The lugs 2a and 2b move with these bent sections along the outer faces 1a, 1b of the activating element 1. In their further course, the lugs 2a and 2b are bent downward and hold the ends of the restoring spring 4 by way of these further sections. Finally, the activating element 1 has a receiving device 13 on the upper side facing away from the driver element 1 for the connection of a shifting arm, which is not shown, and which is operated, if required, by way of further connection links by a conventional shifting lever. When the shifting lever is operated during a gear change, the shifting element will pivot around the bolt 8 either to the right or the left—as illustrated in FIG. 4, for example (showing a pivoting to the left).

As mentioned above, the figures illustrate the installation position of the shifting element by which a multi-speed transmission can be shifted incrementally. In the representation according to FIG. 1, the transmission would be in front of the shifting element in a concrete assembly of the parts. A shifting shaft 10 extends out of the transmission. In the representation of the figures, the shifting shaft 10 is shown only as a shaft end which penetrates two approximately horizontally aligned oblong holes 14 and 15 in the lower sections of the activating element 1 and of the driver element 2. The shifting shaft as a whole is symbolized by its shaft axis 11. In the transmission, the shifting shaft is connected with a conventional shift drum.

The two oblong holes 14 and 15 have the same length, and their rounded end sections adapted to the outside diameter of the shifting shaft are used as a stop for the shifting shaft 10 when the shifting element is activated. Furthermore, the oblong hole 15 of the activating element 1 is curved slightly upward, the shifting shaft 10 being guided therein. The bottom side of the oblong hole 14 of the driver element 2 is aligned with the bottom side of the oblong hole 15, while its upper longitudinal side has the shape of an upward-pointing symmetrical saddle roof. By means of this contour, the latter extends beyond the upper longitudinal side 15a of the oblong hole 15 of the activating element 1 (FIG. 4).

Six driver pins 12a-12f are arranged around the shaft axis 11 at an equal mutual distance along a reference circle on a circular disk connected with the shifting shaft 10 (not shown), which is normally called a star wheel. The driver pins 12a, 12f are acted upon by the shifting element in the manner described in the following.

For this purpose, the driver element 2 is bent on its lower side forward and upward—in the direction of the driver pins 12a-12f. In this manner, a U-shaped section 2c is formed that is open in the upward direction. The U-shaped leg pointing to the driver pins 12a-12f has an upwardly open recess 2d in its center area, which recess 2d ends laterally in hook-shaped claws 2e and 2f. The distance of the claws 2e, 2f from one another corresponds to the outer distance of two driver pins 12a-12f; in FIG. 3, for example, of the driver pins 12a and 12f. Adjacent to the claws 2e, 2f, the upper face of the U-leg slopes downward to both sides in the shape of approach inclinations 2g, 2h to the outside.

Figure 3:
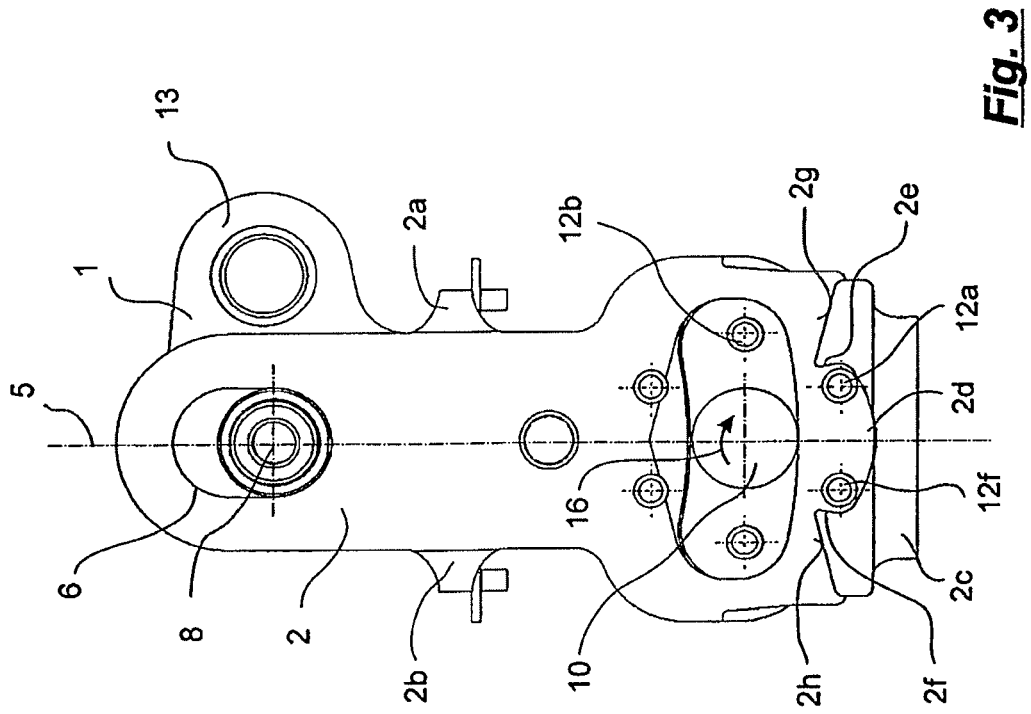
FIG. 3 is a front view of the shifting element in a neutral position.

The shifting element operates as follows. FIG. 3 shows its position in the case of an arbitrarily engaged gear. The driver pins 12a and 12f are situated in the recess 2d of the U-shaped section close to the claws 2e and 2f. When the transmission now is to be upshifted by one gear, the shifting element is pivoted to the left about the axis of the bolt 8 by way of the above-mentioned shifting lever and the shifting arm applied to the receiving device 13. During this pivoting motion, the claw 2e presses the driver pin 12a also to the left, and the driver pin 12a rotates the shifting shaft 10 connected with it clockwise, as indicated by an arrow 16 in FIG. 3.

According to FIG. 4, the pivoting motion of the shifting element is limited by the fact that the shifting shaft 10 strikes against the rounded right ends of the oblong holes 14 and 15. In this case, the shifting shaft 10 has rotated corresponding to the arrow 16 to such an extent that the driver pin 12b now rests against the outer end of the approach inclination 2g. Depending on the intensity of the operated selector lever, the shifting shaft, because of its inertia, could want to rotate even farther and thereby trigger an overshifting of the transmission—as another gear higher. For this purpose, the driver pin 12b would have to "run up" on the approach inclination 2g, which in reality would mean a "downward pressing" of the driver element 2 corresponding to arrow 17. However, this is prevented by a reciprocal blocking of the shifting shaft 10 and the end section of the oblong hole 14. In other words, the driver pin 12b cannot press the driver element 2 downward because, in this position, the upper side of the oblong hole 14 strikes against the outer side of the shifting shaft 10, and such a movement is thereby prevented.

When the shifting lever is released, on the other hand, a restoring spring (not shown in detail) will try to pivot the shifting element back into its starting position. In this case, the blockage between the shifting shaft 10 and the driver element 2 is lifted because now the shifting shaft 10 can slide back along the roof inclination contour. By way of the approach inclination 2g, the driver pin 12b presses the driver element 2 against the force of the restoring spring 4 downward in the direction of the arrow 17. In this case, it should be taken into consideration that the roof inclination and the approach inclination extend in a parallel fashion, and therefore have the same angle of approach. The shifting element pivots to the right back into its starting position. In this position, the driver pin 12b has reached the end of the approach inclination 2g and releases the driver element 2. The restoring spring 4 pulls it upward, and the driver pins 12a and 12b dip into the recess 2d in the area of the claws 2f and 2e. In this position, they are ready, in the event of another intention to shift, to turn the shifting shaft in the described manner by the next angular distance.

If the vehicle transmission is to be downshifted by one gear, the process takes place in the opposite direction, as easily visible in FIGS. 3 and 4. In this case, the driver pin 12f is moved to the right, thus in a counterclockwise manner. The shifting shaft 10 now rotates counterclockwise, and is limited by the rounded left end sections of the oblong holes 14, 15. The blockage and the restoring movement will then take place analogous to the above-described sequences.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A shift device having an over-shift lock for a multi-speed transmission of a motor vehicle equipped with a shifting shaft, the shift device comprising:
   a pivotable shifting element by which the shifting shaft is incrementally rotated, the shifting element having hook-shaped claws that rotate the shifting shaft via driver pins during pivoting of the shifting element in order to engage a next higher or a next lower transmission gear of the multi-speed transmission; wherein
   the pivotable shifting element comprises an activating element operatively configured to initiate the pivoting of the shifting element and a driver element operatively configured to rotate the shifting shaft; and the activating element and the driver element are displaceable with respect to one another along a common longitudinal axis;

a spring force is operatively configured to hold the activating element and the driver element relative to one another in a starting position;

the activating element has an oblong hole;

the driver element has an oblong hole;

the oblong holes of the activating element and the driver element are penetrated by the shifting shaft and have upper and lower longitudinal sides; and in the starting position of the activating element and the driver element, the oblong holes are substantially aligned with one another.

2. The shift device according to claim 1, wherein the shifting shaft is guided in the oblong hole of the activating element along its upper and lower longitudinal sides.

3. The shift device according to claim 2, wherein:

in the starting position, the lower longitudinal side of the oblong hole of the driver element is congruent with the lower longitudinal side of the oblong hole of the activating element, and the upper longitudinal side of the oblong hole of the driver element has a contour that expands upwards relative to the upper longitudinal side of the oblong hole of the activating element.

4. The shift device according to claim 3, wherein:

the contour expands upward from each lateral side of the oblong hole of the driver element toward an apex on the common longitudinal axis.

* * * * *